(12) United States Patent
Cardei et al.

(10) Patent No.: US 11,700,459 B2
(45) Date of Patent: **\*Jul. 11, 2023**

(54) SMART SENSOR SCHEDULER

(71) Applicant: Waymo LLC, Mountain View, CA (US)

(72) Inventors: Vlad Cardei, Redwood City, CA (US); Lucian Ion, Santa Clara, CA (US); Nirav Dharia, Milpitas, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,325

(22) Filed: Feb. 16, 2022

(65) Prior Publication Data

US 2022/0174229 A1 Jun. 2, 2022

Related U.S. Application Data

(63) Continuation of application No. 16/730,760, filed on Dec. 30, 2019, now Pat. No. 11,284,021.

(51) Int. Cl.
| | |
|---|---|
| *H04N 25/443* | (2023.01) |
| *G06F 9/50* | (2006.01) |
| *G06V 10/22* | (2022.01) |
| *H04N 23/61* | (2023.01) |
| *H04N 23/80* | (2023.01) |

(Continued)

(52) U.S. Cl.
CPC ......... *H04N 25/443* (2023.01); *G06F 9/5038* (2013.01); *G06V 10/22* (2022.01); *H04N 23/61* (2023.01); *H04N 23/80* (2023.01); *H04N 25/79* (2023.01); *H04N 25/133* (2023.01); *H04N 25/134* (2023.01)

(58) Field of Classification Search
CPC .......... H04N 5/23218; H04N 5/23219; H04N 5/345–3456; H04N 5/379; G06F 9/4881–4893; G06F 9/5038; H01L 27/14634; G06T 1/20
See application file for complete search history.

(56) References Cited

U.S. PATENT DOCUMENTS

2016/0275642 A1 9/2016 Abeykoon et al.
2018/0308202 A1 10/2018 Appu et al.
(Continued)

*Primary Examiner* — Paul M Berardesca
(74) *Attorney, Agent, or Firm* — McDonnell Boehnen Hulbert & Berghoff LLP

(57) ABSTRACT

A system includes an image sensor having a plurality of pixels that form a plurality of regions of interest (ROIs), image processing resources, and a scheduler configured to perform operations including determining a priority level for a particular ROI of the plurality of ROIs based on a feature detected by one or more image processing resources of the image processing resources within initial image data associated with the particular ROI. The operations also include selecting, based on the feature detected within the initial image data, a particular image processing resource of the image processing resources by which subsequent image data generated by the particular ROI is to be processed. The operations further include inserting, based on the priority level, the subsequent image data into a processing queue of the particular image processing resource to schedule the subsequent image data for processing by the particular image processing resource.

20 Claims, 8 Drawing Sheets

(51) Int. Cl.
*H04N 25/79* (2023.01)
*H04N 25/133* (2023.01)
*H04N 25/13* (2023.01)

(56) References Cited

U.S. PATENT DOCUMENTS

| | | |
|---|---|---|
| 2019/0035154 A1 | 1/2019 | Liu |
| 2019/0081100 A1* | 3/2019 | Matsumoto ....... H01L 27/14627 |
| 2019/0087198 A1 | 3/2019 | Frascati et al. |
| 2019/0178974 A1 | 6/2019 | Droz |
| 2019/0217791 A1 | 7/2019 | Bradley et al. |
| 2019/0220013 A1 | 7/2019 | Bradley et al. |
| 2019/0220014 A1 | 7/2019 | Bradley et al. |
| 2019/0271767 A1 | 9/2019 | Keilaf et al. |
| 2019/0317193 A9 | 10/2019 | O'Keeffe |
| 2020/0321374 A1 | 10/2020 | Ion et al. |

* cited by examiner

PRIORITY POLICY 304

| PRIORITY LEVEL 400 | ROI FEATURES 402 | MAXIMUM LATENCY 404 |
|---|---|---|
| 1 | HUMANS IN THE PATH OF THE VEHICLE | 50 MS |
| 2 | OTHER VEHICLES; HUMANS TO THE SIDES OF THE VEHICLE | 50 MS |
| 3 | TRAFFIC SIGNS AND SIGNALS | 50 MS |
| 4 | ROAD MARKINGS | 75 MS |
| 5 | VEHICLE LOCALIZATION FEATURES | 75 MS |
| 6 | FEATURES BEHIND THE VEHICLE | 75 MS |
| 7 | FEATURES BEYOND A THRESHOLD HEIGHT ABOVE THE VEHICLE | 200 MS |
| 8 | NO DETECTED FEATURES | 200 MS |

Figure 4

SMART SENSOR SCHEDULER

CROSS-REFERENCE TO RELATED APPLICATION

This application is a continuation of and claims priority to U.S. patent application Ser. No. 16/730,760, filed Dec. 30, 2019, and titled "Smart Sensor Scheduler," which is hereby incorporated by reference as if fully set forth in this description.

BACKGROUND

An image sensor includes a plurality of light-sensing pixels that measure an intensity of light incident thereon and thereby collectively capture an image of an environment. A Bayer filter may be applied to the image sensor to allow the image sensor to generate color images of the environment. Image sensors may be used in a plurality of applications such as photography, robotics, and autonomous vehicles.

SUMMARY

The pixels of an image sensor may form a plurality of regions of interest (ROIs). The image sensor may be configured to generate full-resolution image data that includes each of these ROIs, or ROI image data that includes a subset of the ROIs. As the environment of the image sensor changes over time, ROIs that contain therein features of interest may generate more image data than others. To avoid oversubscription of some image processing resources used by the image sensor for processing these ROI images, a scheduler may be provided on the image sensor. The scheduler may be configured to distribute the ROI images among the image processing resources. Based on the content of the ROI images, the scheduler may select a priority level for the ROI image and an image processing resource by which the ROI image is to be processed. The scheduler may then insert the ROI image into a processing queue of the selected resource to scheduler processing of the ROI image. The scheduler may be configured to distribute the ROI images among the processing resources based on a desired latency, throughput, or utilization, among other objectives.

In a first example embodiment, a system is provided that includes an image sensor having a plurality of pixels that form a plurality of ROIs, a plurality of image processing resources, and a scheduler configured to perform operations. The operations include determining a priority level for a particular ROI of the plurality of ROIs based on a feature detected by one or more image processing resources of the plurality of image processing resources within initial image data associated with the particular ROI. The operations also include selecting, based on the feature detected within the initial image data, a particular image processing resource of the plurality of image processing resources by which subsequent image data generated by the particular ROI is to be processed. The operations further include inserting, based on the priority level of the particular ROI, the subsequent image data into a processing queue of the particular image processing resource to schedule the subsequent image data for processing by the particular image processing resource.

In a second example embodiment, a method is provided that includes determining, by a scheduler, a priority level for a particular ROI of a plurality of ROIs formed by a plurality of pixels of an image sensor. The priority level is determined based on a feature detected by one or more image processing resources of a plurality of image processing resources within initial image data associated with the particular ROI. The method also includes selecting, by the scheduler and based on the feature detected within the initial image data, a particular image processing resource of the plurality of image processing resources by which subsequent image data generated by the particular ROI is to be processed. The method further includes inserting, by the scheduler and based on the priority level of the particular ROI, the subsequent image data into a processing queue of the particular image processing resource to schedule the subsequent image data for processing by the particular image processing resource.

In a third example embodiment a non-transitory computer readable storage medium is provided having stored thereon instructions that, when executed by a computing device, cause the computing device to perform operations. The operations include determining a priority level for a particular ROI of a plurality of ROIs formed by a plurality of pixels of an image sensor. The priority level is determined based on a feature detected by one or more image processing resources of a plurality of image processing resources within initial image data associated with the particular ROI. The operations also include selecting, based on the feature detected within the initial image data, a particular image processing resource of the plurality of image processing resources by which subsequent image data generated by the particular ROI is to be processed. The operations further include inserting, based on the priority level of the particular ROI, the subsequent image data into a processing queue of the particular image processing resource to schedule the subsequent image data for processing by the particular image processing resource.

In a fourth example embodiment, a system is provided that includes means for determining a priority level for a particular ROI of a plurality of ROIs formed by a plurality of pixels of an image sensor. The priority level is determined based on a feature detected by one or more image processing resources of a plurality of image processing resources within initial image data associated with the particular ROI. The system also includes means for selecting, based on the feature detected within the initial image data, a particular image processing resource of the plurality of image processing resources by which subsequent image data generated by the particular ROI is to be processed. The system further includes means for inserting, based on the priority level of the particular ROI, the subsequent image data into a processing queue of the particular image processing resource to schedule the subsequent image data for processing by the particular image processing resource.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4 illustrates a priority policy, in accordance with example embodiments.

DETAILED DESCRIPTION

Figure 1:
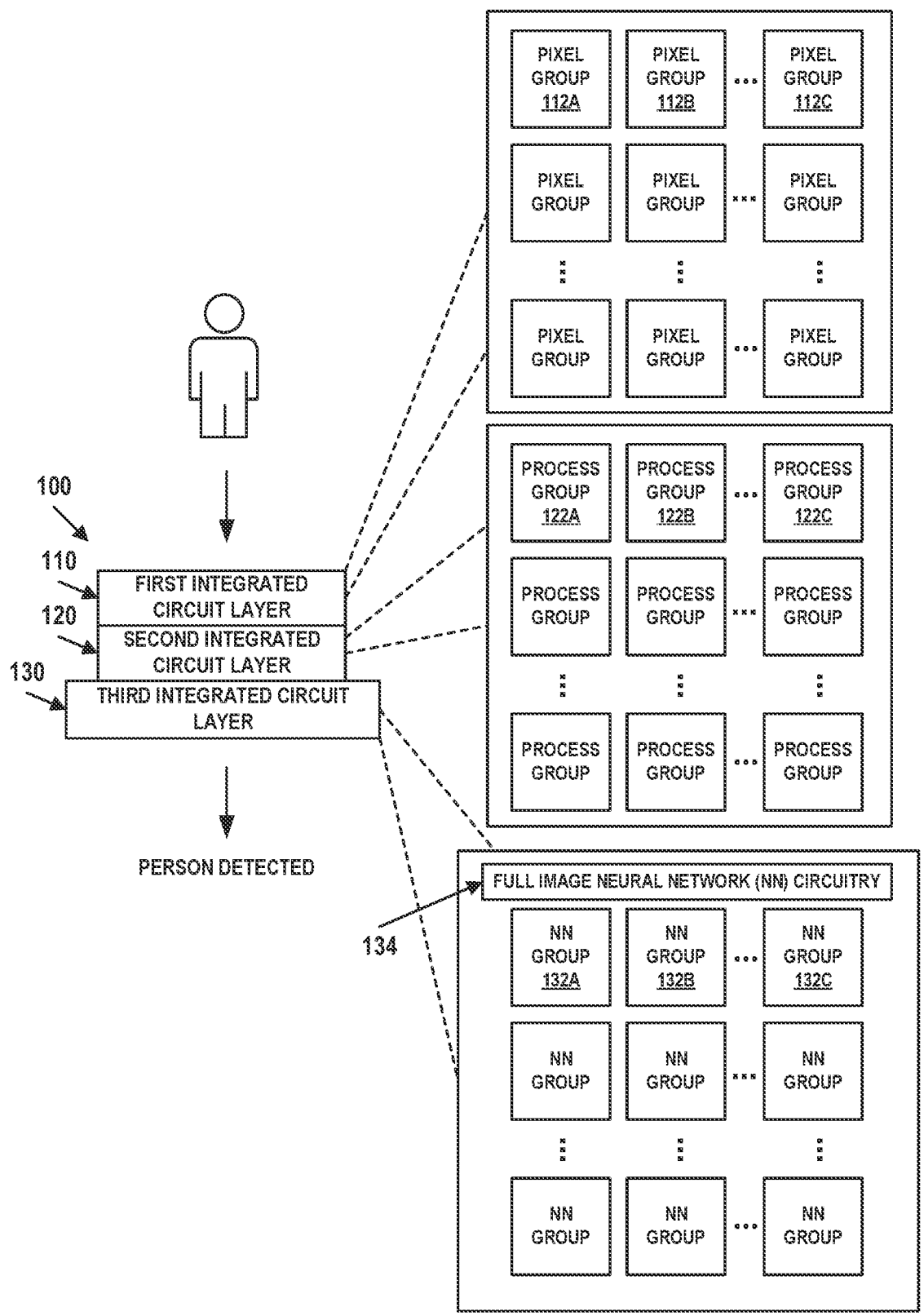
FIG. 1 illustrates a block diagram of an image sensor with three integrated circuit layers, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Sensors may be provided on an autonomous vehicle to assist with perception of and navigation through various environments. These sensors may include image sensors, light detection and ranging (LIDAR) devices, and/or radio detection and ranging (RADAR) devices, among others. These sensors may be capable of generating more data than can be timely processed by processing resources provided by the sensors and/or by the autonomous vehicle. This may be the case, for example, when a large number of sensors is provided on the vehicle and/or when the resolution of each sensor is high, resulting in generation of a large amount of sensor data. Additionally, desired data transfer latency and/or the amount of data transfer bandwidth available on the sensor and/or the autonomous vehicle may limit the amount of sensor data that can be utilized.

Accordingly, sensing components and corresponding circuitry may be provided that divide a field of view of the sensor into a plurality of regions of interest (ROIs) and allow for selective readout of sensor data from individual ROIs. For example, in the case of an image sensor, the pixels of the image sensor may form a plurality of ROIs, each of which may be read out independently of other ROIs. That is, the image sensor may generate image data in some ROIs (e.g., those that contain therein some object of interest) while other ROIs (e.g., those that do not contain an object of interest) are not used to generate image data. These ROIs may allow the image sensor to accommodate high frame rate and/or high resolution imaging while at the same time reducing the total amount of image data that is generated, analyzed, and/or transmitted.

ROI images and full-resolution images may be processed by a plurality of image processing resources to detect in these images features that are useful in controlling the autonomous vehicle. The image processing resources may include pixel-level processing circuitry, neural network circuitry, control systems of the autonomous vehicle, and/or communicative connections between subsets of the plurality of image processing resources. Some of the image processing resources may be included as part of the circuitry and/or packaging of the image sensor, while others may be provided as part of the circuitry and/or packaging of other components of the autonomous vehicle (e.g., the control system).

The pixel-level processing circuitry may be configured to perform pixel-level processing, such as analog-to-digital conversion, demosaicing, high dynamic range fusion, and image sharpening, among other operations. The neural network circuitry may be configured to process output of the pixel-level processing circuitry to extract higher-order features and/or semantic information from the captured images. The neural network circuitry may also be configured to detect objects of interest within the image data based on the features and/or semantic information. Control systems of the vehicle may be configured to control the vehicle based on outputs of the pixel-level processing circuitry and/or the neural network circuitry, among other information. Communicative connections between these processing resources may allow for sharing of data, coordination, and cooperation between the processing resources in operating the autonomous vehicle.

A scheduler may be provided to coordinate the operations of the image sensor and the image processing resources. Specifically, the scheduler may be configured to schedule the processing of image data generated by the sensor based on the availability of the image processing resources, the relative importance of the features represented by different ROIs, the task being performed by the vehicle, and/or the relationship between the features and the task, among other considerations. For example, the scheduler may be configured to minimize the latency between obtaining a given image data by the image sensor and processing the given image data by the plurality of image processing resources, maximize the utilization of the plurality of image processing resources, and/or maximize the throughput of image data through the plurality of image processing resources.

To that end, the scheduler may be configured to determine priority levels for different ROIs of the plurality of ROIs. The priority level assigned to a particular ROI may be based on a feature detected by one or more image processing resources within initial image data associated with the particular ROI. The initial image data may have been generated by the particular ROI, and the detected feature may be expected to be viewable by the particular ROI at a future time. Alternatively, the initial image data may have been generated by another ROI, and the detected feature may be expected to be viewable by the particular ROI at the future time. The priority level of a given ROI may change over time as different features are present within that ROI.

Priority levels may be assigned by the scheduler according to a predetermined priority policy. The policy may associate each priority level with corresponding combinations of features of interest, tasks being carried out by the vehicle, environmental conditions, relationship between the features of interest and the tasks, and/or other contextual information. Thus, image processing operations that are more important to the operation of the vehicle (e.g., pedestrian detection) may be prioritized relative to image processing operations that are less important. The priority policy may be modifiable to allow for different combinations of features and operational contexts to be prioritized to different extents.

The scheduler may also be configured to select, based on the feature detected within the initial image data, a particular image processing resource of the plurality of image processing resources by which subsequent image data generated by the particular ROI is to be processed. The particular image processing resource may be selected based on the availability of this and other image processing resources. For example, the system may include multiple instances of a particular type of image processing resource. The scheduler may select an instance that has a shortest processing queue or a processing queue containing therein only lower priority tasks, among other considerations.

In one example, when the detected feature is a crosswalk, the particular image processing resource may be a neural network configured to detect pedestrians. In another example, when the detected feature is a vehicle, the particular image processing resource may be a neural network configured to continue to detect and/or track the vehicle. In a further example, when the feature of interest is a final result of processing by one or more neural networks, the particular image processing resource may be a communicative connection between the one or more neural networks and a control system of the vehicle. Allocation of this communicative connection may allow the control system of the vehicle to determine how to operate the vehicle based on this final result. As can be seen from these examples, the image processing resource selected by the scheduler may be the same as or different from the image processing resources that initially detected the feature of interest.

In some implementations, the set of image processing resources available to process image data from a given ROI may be spatially constrained. For example, the image sensor and at least a portion of the image processing resources may be implemented as part of a multi-layer integrated circuit. The image sensor may be defined on a first layer of the integrated circuit, while the image processing resources may be defined on one or more additional layers of the integrated circuit. The pixels of a particular ROI may be electrically connected to a subset, but not all, of the image processing resources. This subset of the image processing resources may be spatially co-located with the ROI.

For example, the subset may include processing resources disposed above the ROI (i.e., in the same area of the integrated circuit as the ROI). In another example, the subset may include image processing resources disposed above the ROI and any adjacent ROIs, but might not include the image processing resources disposed above non-adjacent ROIs. Thus, the scheduler may be configured to select the image processing resources for a particular ROI from the subset available for that particular ROI. The image processing resources may be interconnected with one another in a similarly spatially-constrained fashion. For example, pixel-level processing circuitry located above a given ROI may be interconnected to neural network circuitry located above the given ROI, but not neural network circuitry located above other ROIs. In other implementations, each ROI may be processed by any available image processing resource without any spatial constraints.

The scheduler may be further configured to insert the subsequent image data into a processing queue of the particular image processing resource. A position in the processing queue at which the subsequent image data is inserted may be based on the priority level of the particular ROI. This insertion into the queue may schedule the subsequent image data for processing by the particular image processing resource. For example, image data with a high priority may be inserted into the processing queue such that it precedes any image data with a lower priority and follows any image data with a higher priority. Thus, image data may be processed in an order that reflects its importance in operating the autonomous vehicle.

When multiple image data have the same or similar priority, the processing order may be determined according to policy, such as a first-in-first-out (FIFO) policy, a last-in-first-out (LIFO) policy, a shortest-job-first (SJF) policy, or a round robin (RR) policy, among other possibilities. Further, image data may be assigned an expiration time. Expired image data may be dropped from the processing queue, thus allowing the image processing resources to avoid processing image data that no longer accurately represents the current environment of the vehicle.

The scheduler may also be configured to consider dependencies among different image processing resources. For example, when neural network circuitry is scheduled to operate on an intermediate result generated by pixel-level processing circuitry, the intermediate result may be inserted into the processing queue of the neural network circuitry at a position that allows sufficient time for the intermediate result to be generated. Thus, the position of the intermediate result in the processing queue of the neural network circuitry may depend on a position of the initial image data in a processing queue of the pixel-level processing circuitry that generated the intermediate result.

II. EXAMPLE SMART SENSOR

FIG. 1 is a block diagram of an example image sensor 100 with three integrated circuit layers. Image sensor 100 may use the three integrated circuit layers to detect objects. For example, image sensor 100 may capture an image that includes a person and output an indication of "person detected." In another example, image sensor 100 may capture an image and output a portion of the image that includes a vehicle that was detected by image sensor 100.

The three integrated circuit layers includes a first integrated circuit layer 110, a second integrated circuit layer 120, and a third integrated circuit layer 130. First integrated circuit layer 110 is stacked on second integrated circuit layer 120, and second integrated circuit layer 120 is stacked on third integrated circuit layer 130. First integrated circuit layer 110 may be in electrical communication with second integrated circuit layer 120. For example, first integrated circuit layer 110 and second integrated circuit layer 120 may be physically connected to one another with interconnects. Second integrated circuit layer 120 may be in electrical communication with third integrated circuit layer 130. For example, second integrated circuit layer 120 and third integrated circuit layer 130 may be physically connected to one another with interconnects.

First integrated circuit layer 110 may have a same area as second integrated circuit layer 120. For example, the length and width of first integrated circuit layer 110 and second integrated circuit layer 120 may be the same while the heights may be different. Third integrated circuit layer 130 may have a larger area than first and second integrated circuit layers 110, 120. For example, third integrated circuit layer 130 may have a length and width that are both twenty percent greater than the length and the width of first and second integrated circuit layers 110, 120.

First integrated circuit layer 110 may include an array of pixel sensors that are grouped by position into pixel sensor groups (each pixel sensor group referred to as "pixel group" in FIG. 1) 112A-112C (collectively referred to by 112). For example, first integrated circuit layer 110 may include a 6400×4800 array of pixel sensors grouped into three hundred twenty by two hundred forty pixel sensor groups, where each pixel sensor group includes an array of 20×20 pixel sensors. Pixel sensor groups 112 may be further grouped to define ROIs.

Each of pixel sensor groups 112 may include 2×2 pixel sensor sub-groups. For example, each of the pixel sensor groups of 20×20 pixel sensors may include ten by ten pixel sensor sub-groups, where each pixel sensor sub-group includes a red pixel sensor in an upper left, a green pixel sensor in a lower right, a first clear pixel sensor in a lower left, and a second clear pixel sensor in an upper right, each sub-group also referred to as Red-Clear-Clear-Green (RCCG) sub-groups.

In some implementations, the size of the pixel sensor groups may be selected to increase silicon utilization. For example, the size of the pixel sensor groups may be such that more of the silicon is covered by pixel sensor groups with the same pattern of pixel sensors.

Second integrated circuit layer 120 may include (pixel-level) image processing circuitry groups (each image processing circuitry group referred to as "process group" in FIG. 1) 122A-122C (collectively referred to by 122). For example, second integrated circuit layer 120 may include three hundred twenty by two hundred forty image processing circuitry groups. Image processing circuitry groups 122 may be configured to each receive pixel information from a corresponding pixel sensor group and further configured to perform image processing operations on the pixel information to provide processed pixel information during operation of image sensor 100.

In some implementations, each image processing circuitry group 122 may receive pixel information from a single corresponding pixel sensor group 112. For example, image processing circuitry group 122A may receive pixel information from pixel sensor group 112A and not from any other pixel group, and image processing circuitry group 122B may receive pixel information from pixel sensor group 112B and not from any other pixel group.

In some implementations, each image processing circuitry group 122 may receive pixel information from multiple corresponding pixel sensor groups 112. For example, image processing circuitry group 122A may receive pixel information from both pixel sensor groups 112A and 112B and no other pixel groups, and image processing circuitry group 122B may receive pixel information from pixel group 112C and another pixel group, and no other pixel groups.

Having image processing circuitry groups 122 receive pixel information from corresponding pixel groups may result in fast transfer of the pixel information from first integrated circuit layer 110 to second layer 120 as image processing circuitry groups 122 may physically be close to the corresponding pixel sensor groups 112. The longer the distance over which information is transferred, the longer the transfer may take. For example, pixel sensor group 112A may be directly above image processing circuitry group 122A and pixel sensor group 112A may not be directly above the image processing circuitry group 122C, so transferring pixel information from pixel sensor group 112A to the image processing circuitry group 122A may be faster than transferring pixel information from the pixel sensor group 112A to image processing circuitry group 122C, if there were interconnects between pixel sensor group 112A and image processing circuitry group 122C.

Image processing circuitry groups 122 may be configured to perform image processing operations on pixel information that image processing circuitry groups 122 receives from the pixel groups. For example, image processing circuitry group 122A may perform high dynamic range fusion on pixel information from pixel sensor group 112A and image processing circuitry group 122B may perform high dynamic range fusion on pixel information from pixel sensor group 112B. Other image processing operations may include, for example, analog to digital signal conversion and demosaicing.

Having image processing circuitry groups 122 perform image processing operations on pixel information from corresponding pixel sensor groups 112 may enable image processing operations to be performed in a distributed fashion in parallel by image processing circuitry groups 122. For example, image processing circuitry group 122A may perform image processing operations on pixel information from pixel sensor group 112A at the same time as image processing circuitry group 122B performs image processing operations on pixel information from pixel group 122B.

Third integrated circuit layer 130 may include neural network circuitry groups 132A-132C (each neural network circuitry group referred to as "NN group" in FIG. 1) 132A-132C (collectively referred to by 132) and full image neural network circuitry 134. For example, third integrated circuit layer 130 may include three hundred twenty by two hundred forty neural network circuitry groups.

Neural network circuitry groups 132 may be configured to each receive processed pixel information from a corresponding image processing circuitry group and further configured to perform analysis for object detection on the processed pixel information during operation of image sensor 100. In some implementations, neural network circuitry groups 132 may each implement a convolutional neural network (CNN).

In some implementations, each neural network circuitry group 132 may receive processed pixel information from a single corresponding image processing circuitry group 122. For example, neural network circuitry group 132A may receive processed pixel information from image processing circuitry group 122A and not from any other image processing circuitry group, and neural network circuitry group 132B may receive processed pixel information from image processing circuitry group 122B and not from any other image processing circuitry group.

In some implementations, each neural network circuitry group 132 may receive processed pixel information from multiple corresponding image processing circuitry groups 122. For example, neural network circuitry group 132A may receive processed pixel information from both image processing circuitry groups 122A and 122B and no other image processing circuitry groups, and neural network circuitry group 132B may receive processed pixel information from both image processing circuitry group 122C and another pixel group, and no other pixel groups.

Having the neural network circuitry groups 132 receive processed pixel information from corresponding image processing circuitry groups may result in fast transfer of the processed pixel information from second integrated circuit layer 120 to third integrated circuit layer 130 as neural network circuitry groups 132 may physically be close to the corresponding image processing circuitry groups 122. Again, the longer the distance over which information is transferred, the longer the transfer may take. For example, image processing circuitry group 122A may be directly above neural network circuitry group 132A so transferring processed pixel information from image processing circuitry group 122A to neural network circuitry group 132A may be faster than transferring processed pixel information from image processing circuitry group 122A to neural network circuitry group 132C, if there were interconnects between image processing circuitry group 122A and neural network circuitry group 132C.

Neural network circuitry groups 132 may be configured to detect objects from the processed pixel information that neural network circuitry groups 132 receive from image processing circuitry groups 122. For example, neural network circuitry group 132A may detect objects from the processed pixel information from image processing circuitry group 122A, and neural network circuitry group 132B may detect objects from the processed pixel information from image processing circuitry group 122B.

Having neural network circuitry groups 132 detect objects from the processed pixel information from corresponding image processing circuitry group 122 enables detection to be performed in a distributed fashion in parallel by each of neural network circuitry groups 132. For example, neural network circuitry group 132A may detect objects from processed pixel information from image processing circuitry group 122A at the same time as neural network circuitry group 132B may detect objects from processed pixel information from image processing circuitry group 122B.

In some implementations, neural network circuitry groups 132 may perform intermediate processing. Accordingly, image sensor 100 may use the three integrated circuit layers 110, 120, and 130 to perform some intermediate processing and output just an intermediate result. For example, image sensor 100 may capture an image that includes a person and output an indication of "area of interest in some region of the image," without classifying the object of interest (the person). Other processing, performed outside image sensor 100 may classify the region of interest as a person.

Accordingly, the output from image sensor 100 may include some data representing the output of some convolutional neural network. This data in itself may be hard to decipher, but once it continues to be processed outside image sensor 100, the data may be used to classify the region as including a person. This hybrid approach may have an advantage of reducing required bandwidth. Accordingly, output from neural network circuitry groups 132 may include one or more of selected regions of interest for pixels representing detections, metadata containing temporal and geometrical location information, intermediate computational results prior to object detection, statistical information regarding network certainty level, and classifications of detected objects.

In some implementations, neural network circuitry groups 132 may be configured to implement CNNs with high recall and low precisions. Neural network circuitry groups 132 may each output a list of objects detected, where the object was detected, and timing of detection of the object.

Full image neural network circuitry 134 may be configured to receive, from each of neural network circuitry groups 132, data that indicates objects that neural network circuitry groups 132 detected and detect objects from the data. For example, neural network circuitry groups 132 may be unable to detect objects that are captured by multiple pixel groups, as each individual neural network circuitry group may only receive a portion of processed pixel information corresponding to the object. But, full image neural network circuitry 134 may receive data from multiple neural network circuitry groups 132 and may thus be able to detect objects sensed by multiple pixel groups. In some implementations, full image neural network circuitry 134 may implement a recurrent neural network (RNN). The neural networks may be configurable, both in regard to their architecture (number and type of layers, activation functions, etc.) as well as in regard to the actual values of neural network components (e.g. weights, biases, etc.)

In some implementations, having image sensor 100 perform processing may simplify a processing pipeline architecture, provide higher bandwidth and lower latency, allow for selective frame rate operations, reduce costs with the stacked architecture, provide higher system reliability as an integrated circuit may have fewer potential points of failure, and provide significant cost and power savings on computational resources.

III. EXAMPLE ROI ARRANGEMENT

Figure 2:
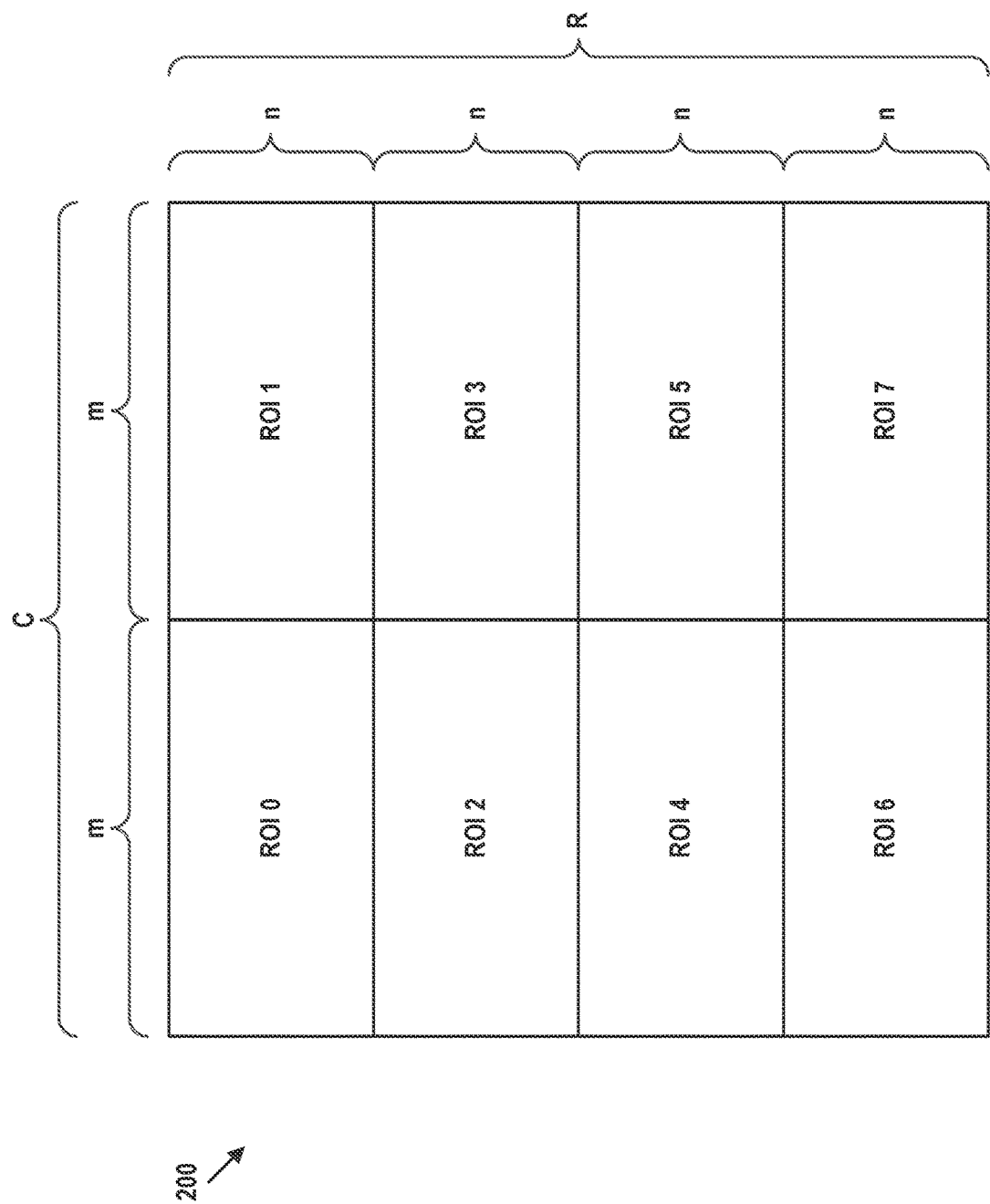
FIG. 2 illustrates an arrangement of regions of interest, in accordance with example embodiments.

FIG. 2 illustrates an example arrangement of ROIs on an image sensor. Namely, image sensor 200 may include pixels forming C columns and R rows. Image sensor 200 may be analogous to image sensor 100. Thus, the pixels of image sensor 200 may correspond to first integrated circuit layer 110. Image sensor may be divided into eight ROIs, including ROI 0, ROI 1, ROI 2, ROI 3, ROI 4, ROI 5, ROI 6, and ROI 7 (i.e., ROIs 0-7), each of which comprises m columns of pixels and n rows of pixels. Thus, C=2m and R=4n. In some implementations, each ROI may include therein multiple pixel groups 112. Alternatively, pixel groups 112 may be sized and arranged such that each pixel group is also an ROI.

FIG. 2 illustrates the ROIs arranged into two columns, with even-numbered ROIs on the left and odd-numbered ROIs on the right. In other implementations, however, the ROIs and their numbering may be arranged in different ways. For example, ROIs 0-3 may be in the left column while ROIs 4-7 may be in the right column. In another example, the ROIs may divide image sensor 200 into 8 columns organized into a single row, with the ROIs numbered from 0-7 arranged from left to right along the 8 columns of the single row. In some implementations, the ROIs may be fixed in a given arrangement. Alternatively, the ROIs may be reconfigurable. Namely, the number of ROIs, position of each ROI, and the shape of each ROI may be reconfigurable.

Image data may be read-out from a given ROI of ROIs 0-7 independently of the other ROIs. For example, image data may be acquired from ROI 0 without also acquiring image data from the other ROIs. In another example, ROI image data may be read out from two or more different ROIs in parallel (e.g., from ROI 2 and ROI 7). Image data generated by a union of ROIs 0-7 may be referred to as a full-resolution image, while image data that includes a subset of ROIs 0-7 may be referred to as an ROI image.

Image sensor 200 may include a combination of analog-to-digital converters (ADCs), multiplexers, and read-out transistors that allows for independent readout of each of ROIs 0-7. ROI image data may be read out from a given ROI column by column or row by row, depending on the arrangement of the read-out circuitry. For example, when ROI 2 is to be read out, read-out circuitry may be reassigned from ROIs 0, 4, and 6 to read out 4 columns of ROI 2 in parallel. In another example, read-out circuitry may be reassigned from ROIs 0, 1, and 3-7 to ROI 2 to read out 8 columns of ROI 2 in parallel. Thus, the rate at which a given ROI may be read-out may depend on the amount of image read-out circuitry that is reassignable to between the ROIs.

The full-resolution image and/or one or more ROI images may be used to select one or more ROIs from which ROI images are to be acquired. For example, the full-resolution images may be analyzed to detect therein an object of interest. An ROI that contains or is expected to contain the object of interest may be selected to be used to generate a plurality of ROI images for further analysis. An object may be considered to be of interest based on, for example, a speed of the object (e.g., when this speed exceeds a threshold speed or is below the threshold speed) a distance between image sensor 100 and the object (e.g., when this distance exceeds a threshold distance is is below the threshold distance), and/or a classification of the object, among other possibilities.

In some implementations, selection of the ROI may be performed by third integrated circuit layer 130 of image sensor 100. For example, full image NN circuitry 134 may be used to select the ROI. In other implementations, the ROI may be selected by a control system (e.g., a control system of an autonomous vehicle) that is communicatively connected to and operates based on the outputs of image sensor 100. Once a particular ROI is selected, the particular ROI may be used to acquire a plurality of ROI images.

IV. EXAMPLE SCHEDULER ARCHITECTURE

Figure 3A:
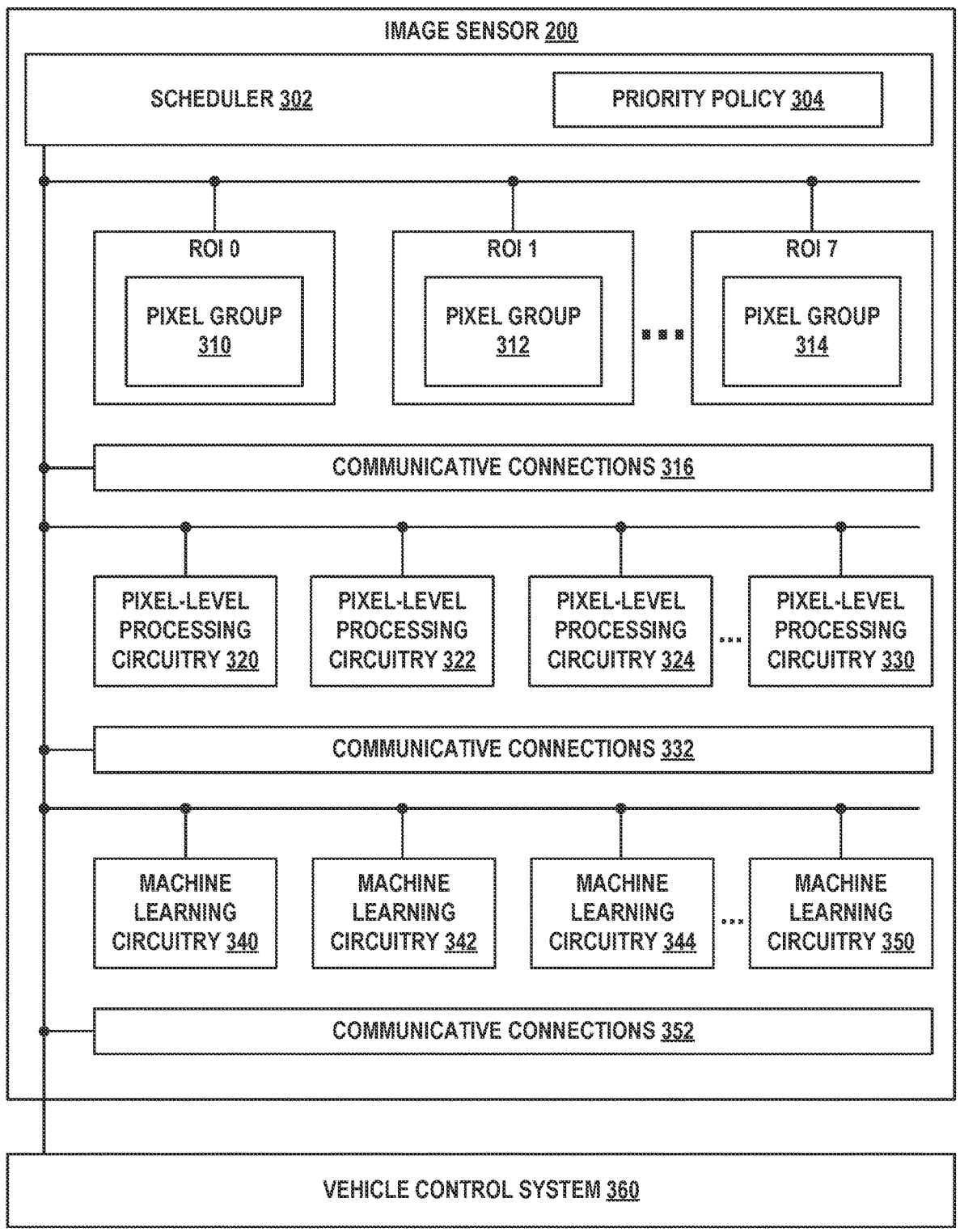
FIG. 3A illustrates an image sensor and a scheduler, in accordance with example embodiments.

FIG. 3A illustrates an example architecture of a scheduler for image sensor 200. Specifically, image sensor 200 may include scheduler 302, pixel groups 310 and 312 through 314 (i.e., pixel groups 310-314) defining ROIs 0-7, respectively, and a plurality of image processing resources. The image processing resources include pixel-level processing circuitry 320, 322, and 324 through 330 (i.e., pixel-level processing circuitry 320-330), machine learning circuitry 340, 342, and 344 through 350 (i.e., machine learning circuitry 340-350), and communicative connections 316, 332, and 352. Image sensor 200 may be configured to provide image data to control system 360, which may also be considered a part of the image processing resources. Control system 360 may represent a combination of hardware and software configured to generate operations for a robotic device or an autonomous vehicle, among other possibilities.

Pixel groups 310-314 represent groupings of the pixels that make up image sensor 200. In some implementations, each of pixel groups 310-314 may correspond to one or more of pixel sensor groups 112. Pixel groups 310-314 may represent circuitry disposed in first integrated circuit layer 110. The number of pixel sensor groups represented by each of pixel groups 310-314 may depend on the size of each of ROIs 0-7. In implementations where the number, size, and/or shape of ROIs are reconfigurable, the subset of pixel sensor groups 112 making up each of pixel groups 310-314 may vary over time based on the number, size, and/or shape of the ROIs.

Pixel-level processing circuitry 320-330 represent circuitry configured to perform pixel-level image processing operations. Pixel-level processing circuitry 320-330 may operate on outputs generated by pixel groups 310-314. The pixel-level operations may include analog-to-digital conversion, demosaicing, high dynamic range fusion, image sharpening, filtering, edge detection, and/or thresholding. Pixel-level operations may also include other types of operations that are not carried out by way of machine learning models (e.g., neural networks) provided on image sensor 200 or by control system 360. In some implementations, each of pixel-level processing circuitry 320-330 may include one or more of process groups 122, among other circuitry configured to perform pixel-level image processing operations. Thus, pixel-level circuitry 320-330 may represent circuitry disposed in second integrated circuit layer 120.

Machine learning circuitry 340-350 may include circuitry configured to execute operations associated with one or more machine learning models. Machine learning circuitry 340-350 may operate on outputs generated by pixel groups 310-314 and/or pixel-level processing circuitry 320-330. In some implementations, each of machine learning circuitry 340-350 may correspond to one or more of neural network groups 132 and/or full image neural network circuitry 132, among other circuitry that implements machine learning models. Thus, machine learning circuitry 340-350 may represent circuitry disposed in third integrated circuit layer 130.

Communicative connections 316 may represent electrical interconnections between pixel-level processing circuitry 320-330 and pixel groups 310-314. Similarly, communicative connections 332 may represent electrical interconnections between (i) machine learning circuitry 340-350 and (ii) pixel-level processing circuitry 320-330 and/or pixel groups 310-314. Further, communicative connections 352 may represent electrical interconnections between machine learning circuitry 340-350 and control system 360. Communicative connections 316, 332, and 352 may be considered a subset of the image processing resources at least because these connections (i) facilitate the transfer of data between circuitry configured to process the image data and (ii) may be modified over time to transfer data between different combinations of the circuitry configured to process the image data.

In some implementations, communicative connections 316 may represent electrical interconnections between first integrated circuit layer 110 and second integrated circuit layer 120, and communicative connections 332 may represent electrical interconnections between second integrated circuit layer 120 and third integrated circuit layer 130. Communicative connections 352 may represent electrical interconnections between third integrated circuit layer 130 and one or more circuit boards by way of which image sensor 200 is connected to control system 360. Each of communicative connections 316, 332, and 352 may be associated with a corresponding maximum bandwidth.

Because image sensor 200 is divided into a plurality of ROIs which may generate ROI image data in an asymmetric fashion, some of pixel groups 310-314 may generate more image data than others. The amount of image data generated by a given pixel group may fluctuate over time depending on the features or objects represented by this image data. Accordingly, some portions of pixel-level processing circuitry 320-330 and/or machine learning circuitry 340-350 might be oversubscribed by being requested to process more of the ROI image data than is requested of other portions. Without a scheduler, this may result in a bottleneck that limits the rate at which ROI image data can be generated and processed.

For example, if pixel-level processing circuitry 320 and machine learning circuitry 340, along with the electrical interconnections therebetween, were the only image processing resources configured to process image data from pixel group 310, the rate at which ROI images are generated from ROI 0 might be limited by the throughput of circuitry 320, 340, and/or the interconnections therebetween. Further, during a period of time when ROI images are being acquired from ROI 0, but not from the other ROIs, circuitry 322-330 and 342-350, as well as the interconnections therebetween, might be idle. In such a fixed assignment of circuitry, approximately 87.5% of the circuitry of image sensor 200 might be idle while ROI image data is being acquired from a single ROI. Thus, such a fixed assignment may be inefficient in terms of utilization of the available circuitry, image data processing throughput, and expended energy (e.g., wasted energy when circuitry is idle).

Accordingly, rather than relying on fixed interconnections between ROIs and image processing resources, scheduler 302 may be configured to dynamically distribute the generated image data for processing among image processing resources 316, 320-330, 340-350, 332, 352, and/or 360 (i.e., image processing resources 316-360) available to image sensor 200. Specifically, the distribution of image data among image processing resources 316-360 may be performed according to priority policy 304, an example of which is illustrated in and discussed with respect to FIG. 4. Priority policy 304 may define priority levels for various combinations of image features, vehicle tasks, vehicle operating conditions, and other contextual information. Thus, priority policy 304 may, at least in part, indicate how to prioritize the processing of different ROIs.

Scheduler 302 may be communicatively connected to each of image processing resources 316-360, and may be aware of (e.g., may receive, access, and/or store a representation of) the capabilities of, workloads assigned to, and/or features detected by each of image processing resources 316-360. Thus, in some implementations, scheduler 302 may be configured to distribute image data among image processing resources 316-360 in a manner that improves or minimizes a latency between obtaining and processing image data, improves or maximizes a utilization of image processing resources 316-360, and/or improves or maximizes a throughput of image data through image processing resources 316-360. These objectives may be quantified by one or more objective functions, each of which may be minimized or maximized (e.g., globally or locally) to achieve the corresponding objective.

V. EXAMPLE PROCESSING QUEUES

Figure 3B:
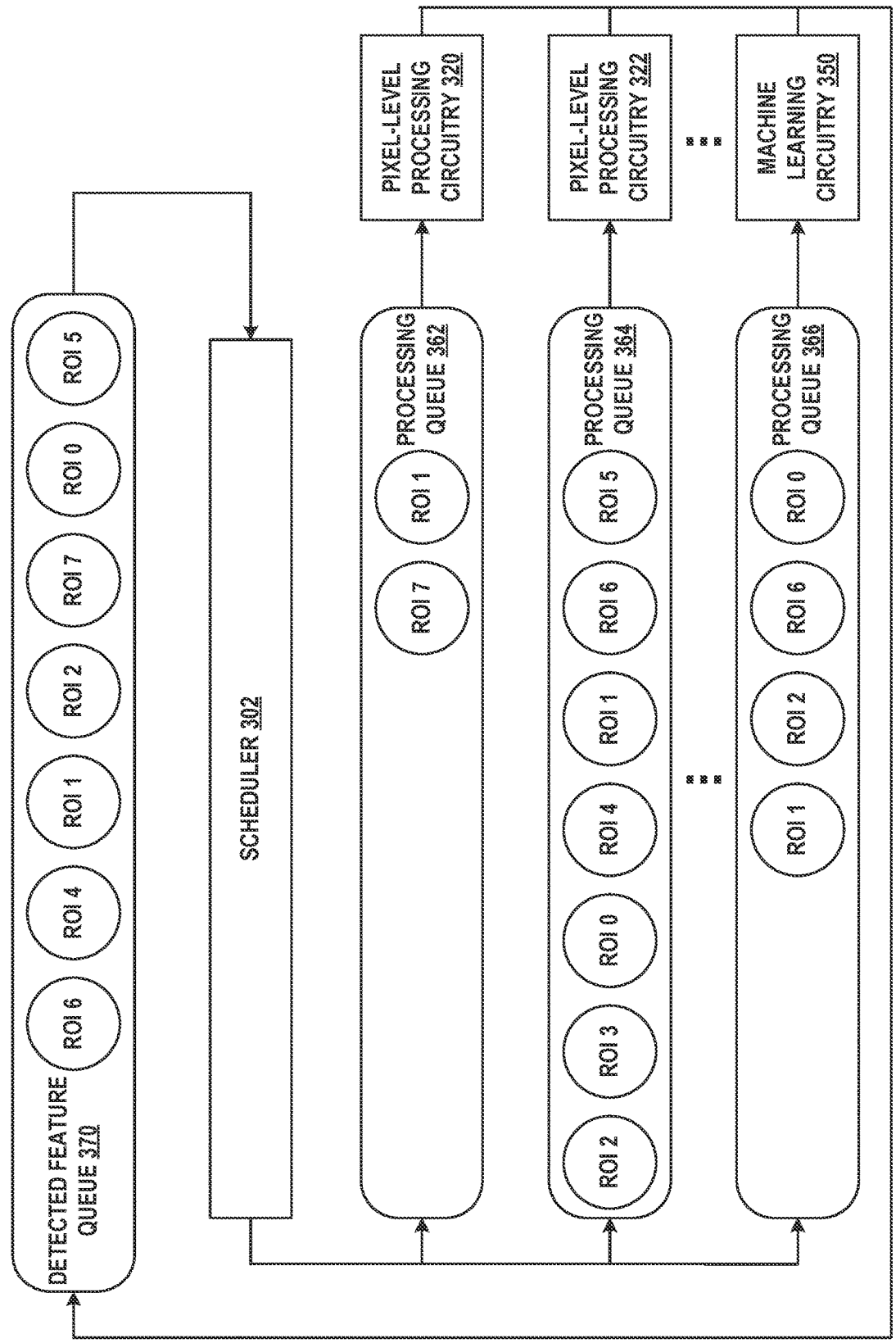
FIG. 3B illustrates image processing queues, in accordance with example embodiments.

FIG. 3B illustrates example processing queues of a plurality of image processing resources. Scheduler 302 may be configured to schedule ROI image data generated by a particular ROI for processing by an image processing resource by adding the ROI image data to a processing queue of the image processing resource. Accordingly, FIG. 3B illustrates processing queue 362 of pixel-level processing circuitry 320, processing queue 364 of pixel level processing circuitry 322, and processing queue 364 of machine learning circuitry 350. Each of pixel-level processing circuitries 324-330, machine learning circuitries 340-344, and/or control system 360 may also be associated with corresponding queues, which are not shown, but are indicated by the ellipses in FIG. 3B. Processing queues ("queues," for short) 362-366 may be implemented as storage buffers, each of which may be co-located with its corresponding processing circuitry on image sensor 200. In other implementations, queues 362-366 may be maintained by scheduler 302, rather than by the corresponding circuitry.

FIG. 3B also illustrates detected feature queue 370 configured to store data representing features that have been detected within corresponding ROIs by the image processing circuitry. Specifically, detected feature queue may be maintained and/or stored by scheduler 302 or another component of image sensor 200. When a particular image processing resource (e.g., machine learning circuitry 350) detects a feature of interest within image data captured by a particular ROI, information regarding this detection and the corresponding ROI may be added to the rear of detected feature queue 370. In the example illustrated in FIG. 3B, detected feature queue 370 includes information regarding features detected in ROIs 5 (at the front of queue 370), 0, 7, 2, 1, 4, and 6 (at the rear of queue 370).

The processing queue in which scheduler 302 places the image data acquired from a particular ROI, and the position of this image data within the queue, may depend on the current and/or expected contents of the ROI image data. Thus, detected feature queue 370 may include, for a particular detected feature, data identifying (i) the ROI in which the feature was detected, (ii) the feature (e.g., the classification, type, of other indicator thereof) that was detected within the ROI, (iii) attributes, properties, and/or characteristics of the detected feature (e.g., distance, speed, etc.), and/or (iv) a time at which initial image data, within which the feature was detected, was captured, among other information. Accordingly, based on this data, scheduler 302 may be configured to determine a corresponding ROI in which the detected feature is expected to be observed at a future time, assign a priority level to the detected feature and/or the corresponding ROI, and select an image processing resource by way of which subsequent image data acquired from the corresponding ROI at the future time is to be processed.

Scheduler 302 may be configured to assign the priority level to the feature based on the type and/or classification of the feature. This assignment of priority level may be facilitated by priority policy 304. Scheduler 302 may be configured to select the corresponding ROI in which the detected feature is expected to be observed at the future time based on attributes of the detected feature (e.g., speed and direction relative to a vehicle on which sensor 200 is mounted). Scheduler 302 may be configured to select the image processing resource for the subsequent image data based on the type and/or classification of the feature. For example, the selected image processing resources may be configured to re-detect, within the subsequent image data, the previously-detected feature, or detect other features commonly associated with this detected feature (e.g., detect traffic lights within the subsequent image data on the basis of detecting a cross-walk within the initial image data).

Scheduler 302 may schedule the image data associated with the ROIs indicated in queue 370 in, for example, a FIFO order. Specifically, scheduler 302 may start scheduling with ROI 5 and thereafter continue through ROIs 0, 7, 2, 1, 4, and 6. Each ROI indicated in queue 370 may represent one or more ROI images, with the exact amount depending on, for example, the type of detected feature and the purpose for which the feature is being detected and/or tracked. In some implementations, scheduler 302 may be configured to schedule multiple ROIs in parallel. In cases where multiple image processing resources are available for processing particular ROI image data, scheduler 302 may be configured to select the image processing resource with the shortest queue. For example, if both circuitry 320 and 322 are available for processing the image data associated with ROI 5, scheduler 302 may add ROI 5 to queue 362 because it is shorter than queue 364.

In some implementations, scheduler 302 may be configured to always add the ROI image data to the rear of the selected queue, regardless of the priority assigned to the ROI image data. In other implementations, the position at which the ROI image data is inserted into the queue may depend on the priority level of the ROI image data. For example, the ROI image data may be inserted such that it preceded any image data having lower priorities and follows any image data having higher priorities. When, for example, scheduler 302 determines to insert ROI 5 into queue 362 and ROI 5 has a higher priority than the already-scheduled ROI 7 and a lower priority than the already-scheduled ROI 1, ROI 5 may be inserted between these two already-scheduled ROIs. Thus, higher-priority ROI image data may be allowed to skip in front of lower-priority image data in the queue, allowing image sensor 200 to detect high-priority features with low latency. Multiple ROI image frames that have the same priority level may be scheduled for processing in a FIFO order, a LIFO order, a SJF order, a random order, or an RR order, among other possibilities.

VI. EXAMPLE SCHEDULER PRIORITY POLICY

FIG. 4 illustrates an example of priority policy 304 that may be used by scheduler 302 to assign priorities to different detected features and/or their corresponding ROIs. For example, priority policy 304 may define a plurality of priority levels 400, ROI features 402, and maximum latencies 404. In the example shown, priority policy includes 8 different priority levels ranging from 1 to 8, with 1 representing the highest priority and 8 representing the lowest priority.

Each of priority levels 400 may be associated with a corresponding set of ROI features 402. For example, priority level 1 may be associated with detection of humans in the path of the vehicle, priority level 2 may be associated with detection of other vehicles and/or detection of humans to the sides of the vehicle. Priority level 3 may be associated with detection of traffic signs and signals, priority level 4 may be associated with detection of road markings, and priority level 5 may be associated with detection of vehicle localization features (e.g., fiducial markers). Priority level 6 may be associated with detection of features behind the vehicle, priority level 7 may be associated with detection of features beyond a threshold height above the vehicle, and priority level 8 may be associated with an absence of any feature detections.

Priority levels 1, 2, and 3 may be associated with a maximum latency of 50 milliseconds between (i) generation of given ROI image data and (ii) completion of processing of the image data by a selected image processing resource. Similarly, priority levels 4, 5, and 6 may be associated with a maximum latency of 75 milliseconds, and priority levels 7 and 8 may be associated with a maximum latency of 200 milliseconds. Scheduler 302 may be configured to assign image data for processing in a manner that allows the image data to be processed within the maximum latency time allowed for its assigned priority level. Thus, the image processing operations may be grouped into, for example, short-term, medium-term, and long-term operations depending on the associated latency. In some implementations, scheduler 302 may be configured to associate an expiration time with each image data inserted into a processing queue, thus allowing the image processing resource to omit processing of the image data if processing is not initiated and/or completed before the expiration time.

In practice, priority policy 304 may be more complicated than shown in FIG. 4. For example, each of priority levels 400 may be associated with one or more additional types of features, tasks being performed by the vehicle, other contextual information, and/or combinations thereof. Thus, a particular feature may be assigned a different priority depending on the operation being performed by the vehicle and/or the environmental conditions in which the vehicle is operating, among other factors. For example, when the vehicle is backing up, features behind the vehicle may be assigned priority level 1, rather than priority level 6. Further, the number of priority levels and the features, tasks, and/or operating conditions corresponding to each priority level may be modified, thus allowing for performance of scheduler 302 to be adjusted and tuned to achieve desired results.

VII. EXAMPLE SPATIAL CONSTRAINTS

Figure 5:
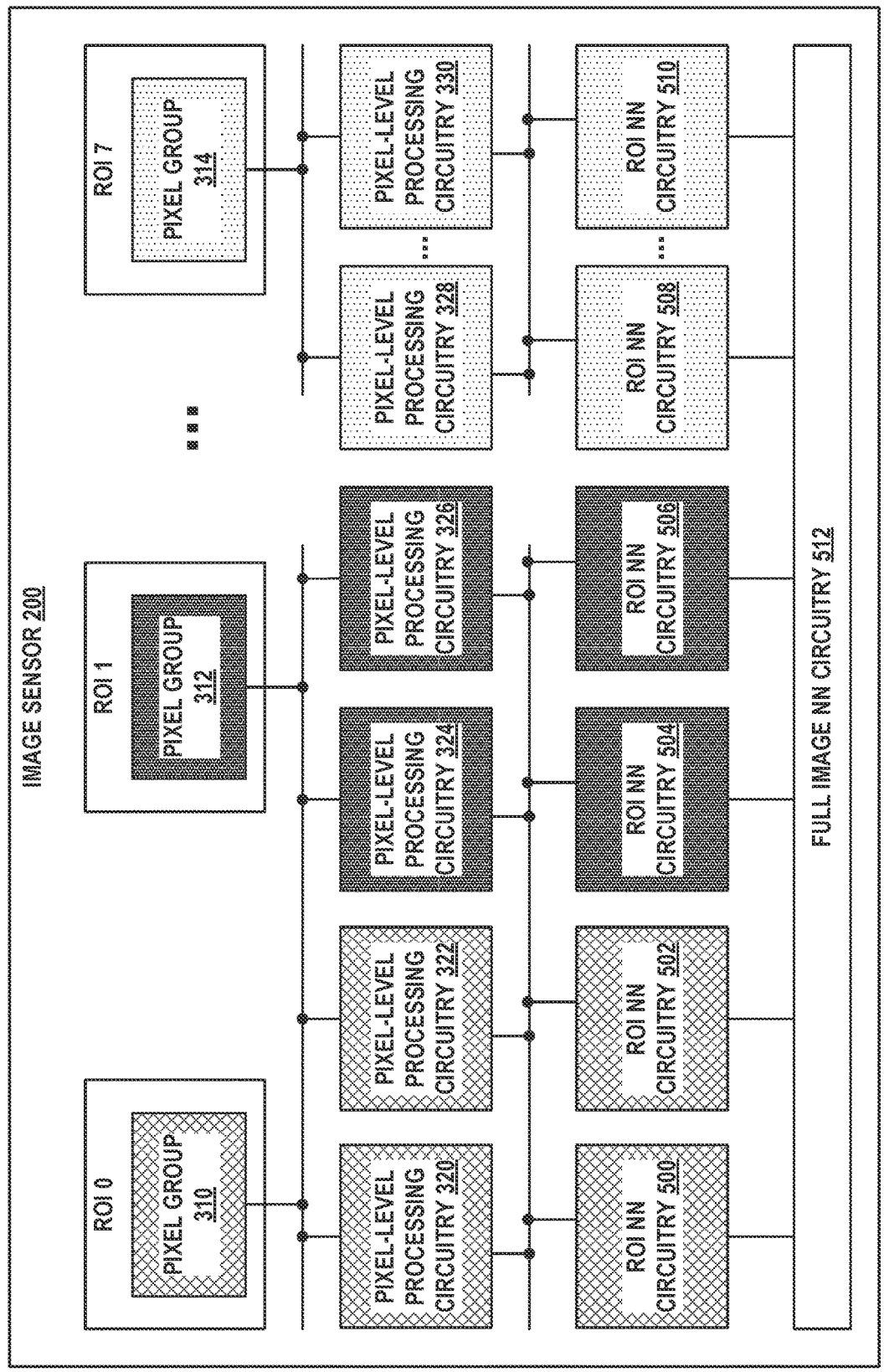
FIG. 5 illustrates interconnections between image processing resources, in accordance with example embodiments.

FIG. 5 illustrates an example implementation of image sensor 200 in which ROI image data may be configured to be processed by spatially co-located image processing resources. Image sensor 200 includes pixel groups 310-314, pixel level processing circuitry 320-330, ROI neural network circuitry 500, 502, 504, 506, and 508 through 510 (i.e., ROI neural network circuitry 500-510), and full image neural network circuitry 512. Neural network circuitry 500-510 and 512 may correspond to machine learning circuitry 340-350 of FIG. 3A.

As the physical distance between a pixel group and the image processing circuitry assigned thereto increases, it may take longer to transfer the image data between these two components. Thus, the latency associated with the image processing may increase and throughput may decrease. For example, in implementations where pixel group 310 is interconnected with each of pixel-level processing circuitry 320-330, the amount of time allotted for data transfer may be sufficiently large to allow for data transfer over the longest transmission path (e.g., corner to corner across image sensor 200 from pixel group 310 to circuitry 330).

On the other hand, as the physical distance between two components decreases, it may take less time to transfer the image data between these two components, thus decreasing the latency and increasing the throughput. Thus, if pixel group 310 is interconnected with a co-located subset of pixel-level processing circuitry 320-330, the amount of time allotted for data transfer may be reduced relative to the fully interconnected example.

Accordingly, in some implementations, scheduler 302 may be configured to take into account any spatial constraints between pixel groups and image processing resources in scheduling the processing of image data. Additionally or alternatively, when multiple image processing resources are available for processing image data, scheduler 302 may prioritize assigning the image data to an image processing resource that is closest to the ROI from which the image data originated. Further, in implementations where each pixel group is interconnected with each of pixel-level processing circuitry 320-330 (and each of pixel-level processing circuitry 320-330 is, in turn, interconnected with the ROI neural network circuitries), scheduler 302 may simulate a spatial constraint by scheduling a given pixel group for processing by co-located circuitry and avoiding scheduling the given pixel group by non-co-located circuitry.

In general, circuitry may be considered to be co-located with a pixel group when the circuitry is disposed within a threshold distance of the pixel group and/or when data can be transmitted therebetween in under a threshold period of time.

In the embodiment illustrated in FIG. 5, pixel group 310 may be disposed in the same portion of image sensor 200 (i.e., in the same area but in a different layer) as pixel-level processing circuitry 320 and 322 and ROI neural network circuitry 500 and 502, as indicated by the shared hatched pattern thereof. Similarly, pixel group 312 may be may be disposed in the same portion of image sensor 200 as pixel-level processing circuitry 324 and 326 and ROI neural network circuitry 504 and 506, and pixel group 314 may be may be disposed in the same portion of image sensor 200 as pixel-level processing circuitry 328 and 330 and ROI neural network circuitry 508 and 510. Thus, pixel groups 310-314 may be considered to be co-located with any circuitry disposed in the same area of, but in a different layer, of image sensor 200.

Further, as illustrated in FIG. 2, ROIs 0 and 1 may be adjacent to one another, but not to ROI 7. Thus, pixel-level processing circuitry 324 and 326 and ROI neural network circuitry 504 and 506 may also be adjacent to ROI 0, but not ROI 7. Accordingly, pixel-level processing circuitry 320-322 and ROI neural network circuitry 500-506 may each be viewed as being co-located with each of pixel groups 310 and 312, but not pixel group 314. Thus, these components are shown interconnected with one another in FIG. 5.

In some implementations, circuitry (not shown) disposed beneath the pixel group that defines ROI 2 may also be considered to be co-located with pixel group 310, and circuitry disposed beneath the pixel group that defines ROI 3 may also be considered to be co-located with pixel group 312. In other implementations, pixel-level processing circuitry 324 might be considered co-located with pixel group 310 (e.g., due to being directly adjacent thereto), while pixel-level processing circuitry 326 might not be considered co-located with pixel group 310 (e.g., due to not being directly adjacent thereto). Full image neural network circuitry 512 may be viewed as co-located with each of pixel groups 310-314 in that it is configured to process full-resolution images (e.g., by aggregating the processing results from multiple ROIs).

Accordingly, the subset of circuitry 320-330 and 500-510 that is considered co-located with a given pixel group may vary. This subset may be defined, at the time image sensor 200 is manufactured, by the formation of some, but not other, interconnections. Alternatively or additionally, the subset may be defined dynamically by defining, for scheduler 302, the subset of image processing resources by which image data from a particular ROI may be processed. In either case, scheduler 302 may be configured to enforce any hard-wired and/or programmed spatial constraints. Specifically, scheduler 302 may be configured to insert the image data associated with a particular ROI into the queues of image processing resources that are included in the co-located subset of image processing resources, and avoid inserting this image data into the queues of image processing resources that are not included in the subset.

VIII. EXAMPLE DEPENDENCY-AWARE SCHEDULING

Figure 6:
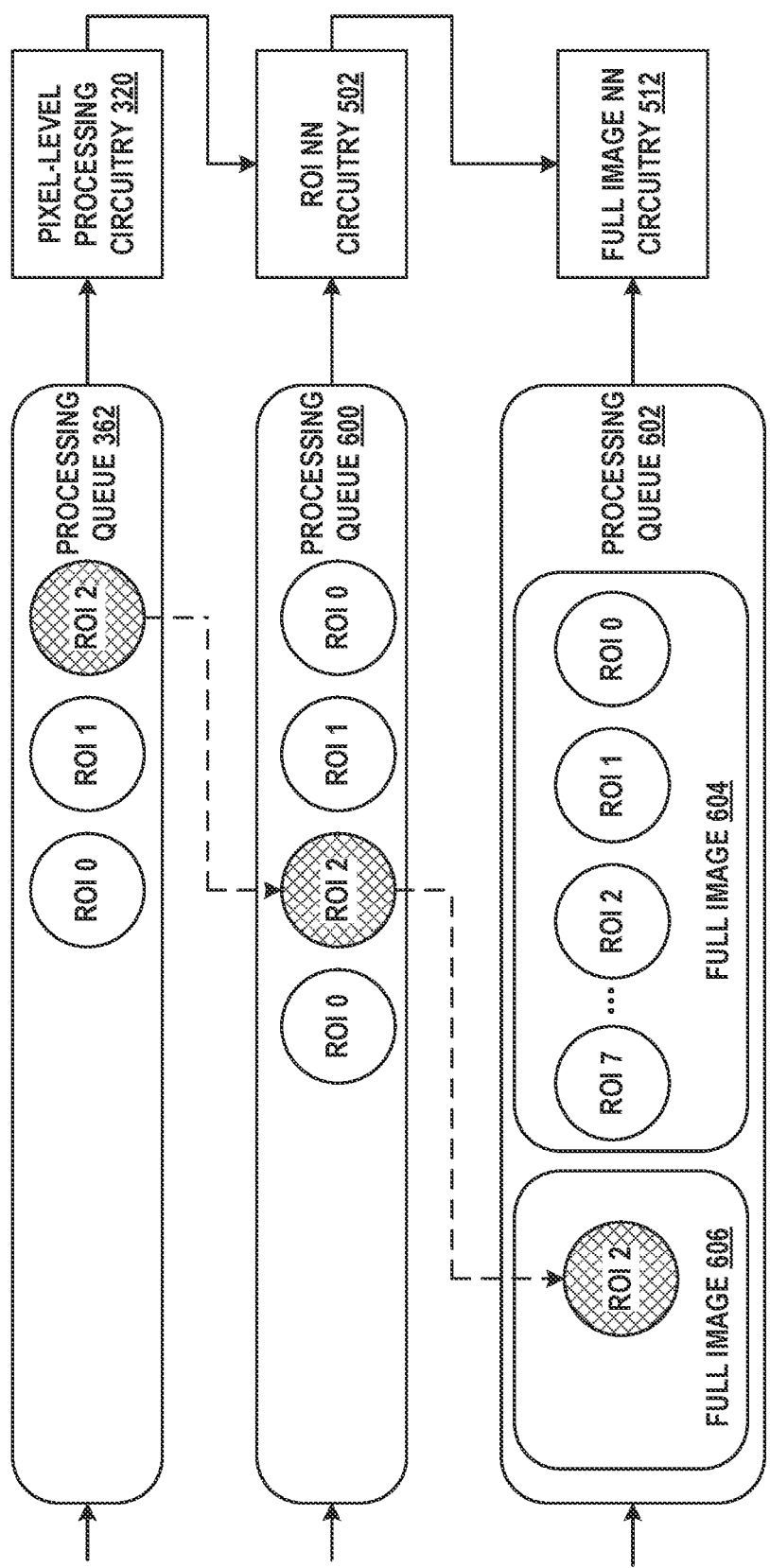
FIG. 6 illustrates image processing queues, in accordance with example embodiments.

Scheduler 302 may also be configured to schedule the image data for processing in a dependency-aware manner. Specifically, FIG. 6 illustrates scheduling dependencies that may be accounted for by scheduler 302. FIG. 6 illustrates pixel-level processing circuitry 320, ROI neural network circuitry 502, and full image neural network circuitry 512, each of which are associated with a corresponding one of processing queues 362, 600, and 602, respectively.

In some cases, image data from a particular ROI may be processed sequentially by multiple image processing components. For example, as illustrated in FIG. 6, image data acquired from ROI 2 may first be processed by pixel-level processing circuitry 320 to generate an intermediate result. The intermediate result of pixel-level processing circuitry 320 may then be provided to ROI neural network circuitry 502, which may use this intermediate result to detect higher-order image features. The output of ROI neural network circuitry 502 may then be combined with similar results associated with the other ROIs that make up the full-resolution image and may be processed by full image neural network circuitry 512.

For example, pixel-level processing circuitry 320 may be configured to generate an HDR image based on multiple ROI images from ROI 2. ROI neural network circuitry 502 may detect within the HDR image various edges, curves, and other geometric features. Full image neural network circuitry may aggregate such features from multiple ROIs to detect one or more objects of interest (e.g., pedestrians, vehicles, etc.).

Rather than waiting for the output of circuitry 320 to be generated and placed in queue 370 before scheduling circuitry 502, and subsequently waiting for the output of circuitry 502 and placed in queue 370 before scheduling circuitry 512, scheduler 302 may be configured to schedule each of circuitries 320, 502, and 512 as part of a single scheduling operation. Further, in scheduling these circuitries, scheduler 302 may take into account the processing time associated with each circuitry. Thus, as illustrated in FIG. 6, the image data associated with ROI 2 may be placed at the front of queue 362. The intermediate result of circuitry 320 may be placed in queue 600 before the image data associated with ROI 0 and after ROI 1, thus allowing the intermediate result to be generated before it is expected as input by circuitry 502. Similarly, the output of circuitry 502 may be placed in queue 602 after the image data associated with ROIs 0-7 making up full image 604, thus allowing the output of circuitry 502 to be generated before it is expected as input by circuitry 512.

IX. ADDITIONAL EXAMPLE OPERATIONS

Figure 7:
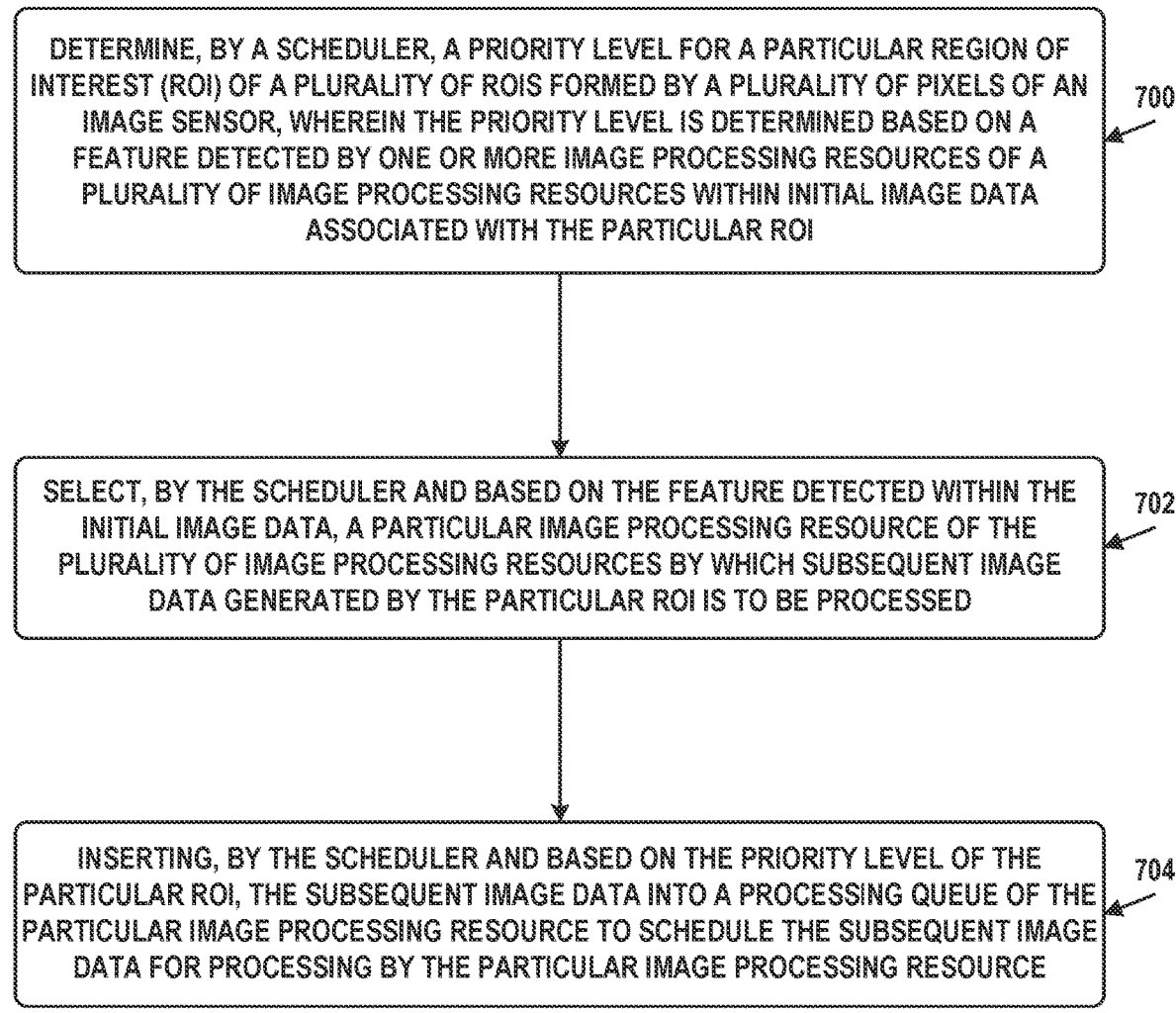
FIG. 7 illustrates a flow chart, in accordance with example embodiments.

FIG. 7 illustrates a flow chart of operations related to scheduling of image data for processing by image processing resources. The operations may be carried out by image sensor 100, image sensor 200, and/or scheduler 302, among other possibilities. However, the operations can also be carried out by other types of devices or device subsystems. For example, the process could be carried out by a server device, an autonomous vehicle, and/or a robotic device.

The embodiments of FIG. 7 may be simplified by the removal of any one or more of the features shown therein. Further, these embodiments may be combined with features, aspects, and/or implementations of any of the previous figures or otherwise described herein.

Block 700 may involve determining, by a scheduler, a priority level for a particular ROI of a plurality of ROIs formed by a plurality of pixels of an image sensor. The priority level may be determined based on a feature detected by one or more image processing resources of a plurality of image processing resources within initial image data associated with the particular ROI.

Block 702 may involve selecting, by the scheduler and based on the feature detected within the initial image data, a particular image processing resource of the plurality of image processing resources by which subsequent image data generated by the particular ROI is to be processed.

Block 704 may involve inserting, by the scheduler and based on the priority level of the particular ROI, the subsequent image data into a processing queue of the particular image processing resource to schedule the subsequent image data for processing by the particular image processing resource.

In some embodiments, the image sensor may include a first layer of an integrated circuit, and the plurality of image processing resources may include one or more additional layers of the integrated circuit. Image data generated by the particular ROI may be configured to be processed by a first subset of image processing resources of the plurality of image processing resources, and the first subset of image processing resources may be spatially co-located with the particular ROI on the integrated circuit. Thus, selecting the particular image processing resource may include selecting the particular image processing resource from the first subset of image processing resources.

In some embodiments, selecting the particular image processing resource may include selecting (i) a first image processing resource of the plurality of image processing resources by which the subsequent image data generated by the particular ROI is to be processed to generate an intermediate result and (ii) a second image processing resource of the plurality of image processing resources by which the intermediate result is to be processed.

In some embodiments, inserting the subsequent image data into the processing queue of the particular image processing resource may include inserting the subsequent image data into a first processing queue of the first image processing resource and, based on a position of the subsequent data in the first processing queue, inserting the intermediate result into a second processing queue of the second image processing resource such that the intermediate result is scheduled for processing by the second image processing resource after the intermediate result is generated by the first image processing resource.

In some embodiments, determining the priority level for the particular ROI may include receiving, from the one or more image processing resources, an indication that the feature was detected within the initial image data. The particular ROI may be determined based on a subset of the plurality of pixels from which the one or more image processing resources obtained the initial image data.

In some embodiments, determining the priority level for the particular ROI may include selecting the priority level from a plurality of priority levels based on the feature detected by one or more image processing resources. Each respective priority level of the plurality of priority levels may be associated with at least one corresponding image data feature.

In some embodiments, the particular image processing resource may be selected further based on environmental conditions expected to be present at a time when the subsequent image data is generated.

In some embodiments, inserting the subsequent image data into the processing queue of the particular image processing resource may include determining an expiration time by which the subsequent image data is to be processed by the particular image processing resource. The expiration time may be associated with the subsequent image data in the processing queue. The particular image processing resource may be configured to omit processing the subsequent image data after the expiration time.

In some embodiments, the initial image data may be generated by the particular ROI, and determining the priority level for the particular ROI may include determining that the feature detected by the one or more image processing resources within the initial image data generated by the particular ROI is expected to remain within the particular ROI at a time when the subsequent image data is planned to be captured.

In some embodiments, the initial image data may be generated by a second ROI different from the particular ROI, and determining the priority level for the particular ROI may include determining that the feature detected by the one or more image processing resources within the initial image data generated by the second ROI is expected to move from the second ROI to the particular ROI and be viewable by the particular ROI at a time when the subsequent image data is planned to be captured.

In some embodiments, a vehicle may be configured to operate based on output of the plurality of image processing resources. The priority level for the particular ROI may be determined further based on (i) a task being carried out by the vehicle and (ii) a relationship between the task and the feature detected by the one or more image processing resources.

In some embodiments, the particular image processing resource may be selected further based on an amount of image data in the processing queue of the particular image processing resource.

In some embodiments, the particular image processing resource may be selected further based on an at least one of: (i) a first objective function that minimizes a latency between obtaining a given image data by the image sensor and processing the given image data by the plurality of image processing resources, (ii) a second objective function that maximizes a utilization of the plurality of image processing resources, or (iii) a third objective function that maximizes a throughput of image data through the plurality of image processing resources.

In some embodiments, the plurality of image processing resources may include one or more of: (i) pixel-level processing circuitry, (ii) neural network circuitry, (iii) a control system of an autonomous vehicle, or (iv) communicative connections between subsets of the plurality of image processing resources.

In some embodiments, the scheduler may be configured to determine to deactivate an additional ROI of the plurality of ROIs based on an additional feature detected by one or more additional image processing resources of the plurality of image processing resources within additional image data associated with the additional ROI. Based on the additional ROI, one or more further image processing resources of the plurality of image processing resources may be selected to be deactivated. The one or more further image processing resources may be deactivated.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
an image sensor comprising a plurality of pixels that form a plurality of regions of interest (ROIs);
a first plurality of image processing resources located in a first layer of an integrated circuit;
a second plurality of image processing resources located in a second layer of the integrated circuit; and
a scheduler comprising one or more of circuitry or a processor, and configured to perform operations comprising:
identifying a particular ROI of the plurality of ROIs based on a feature detected within an initial image data associated with the particular ROI;
selecting, based on the feature detected within the initial image data, (i), from the first plurality of image processing resources, a first image processing resource by which subsequent image data generated by the particular ROI is to be processed to generate an intermediate result and (ii), from the second plurality of image processing resources, a second image processing resource by which the intermediate result is to be processed; and
scheduling (i) the subsequent image data for processing by the first image processing resource and (ii) the intermediate result for processing by the second image processing resource.

2. The system of claim 1, wherein the first plurality of image processing resources comprises pixel-level processing circuitry configured to operate on outputs of the plurality of pixels, and wherein the second plurality of image processing resources comprises machine learning circuitry configured to operate on outputs of the pixel-level processing circuitry.

3. The system of claim 1, wherein the plurality of pixels are located in a third layer of the integrated circuit that is disposed on a first side of the first layer of the integrated circuit, and wherein the second layer of the integrated circuit is disposed on a second side of the first layer of the integrated circuit.

4. The system of claim 1, wherein the feature is detected by one or more image processing resources of the first plurality of image processing resources and the second plurality of image processing resources.

5. The system of claim 1, wherein at least one image processing resource of the first image processing resource or the second image processing resource is selected further based on the at least one image processing resource being spatially co-located with the particular ROI.

6. The system of claim 1, wherein:
scheduling the subsequent image data for processing by the first image processing resource comprises inserting the subsequent image data into a first processing queue of the first image processing resource; and scheduling the intermediate result for processing by the second image processing resource comprises inserting the intermediate result into a second processing queue of the second image processing resource.

7. The system of claim 6, wherein inserting the intermediate result into the second processing queue comprises:
   determining (i) a first position of the subsequent image data in the first processing queue and (ii) an expected processing time of the subsequent image data by the first image processing resource; and
   before the intermediate result is generated, inserting the intermediate result at a second position within the second processing queue, wherein the second position is separated in time from the first position by at least the expected processing time.

8. The system of claim 6, wherein inserting the intermediate result into the second processing queue comprises:
   determining an expiration time by which the intermediate result is to be processed by the second image processing resource; and
   associating the expiration time with the intermediate result in the second processing queue, wherein the second image processing resource is configured to omit processing the intermediate result after the expiration time.

9. The system of claim 6, wherein one or more of the first image processing resource or the second image processing resource is selected further based on an amount of data in one or more of the first processing queue or the second processing queue.

10. The system of claim 1, wherein identifying the particular ROI comprises:
    identifying the particular ROI based on a subset of the plurality of pixels, wherein the subset represents the feature detected within the initial image data.

11. The system of claim 1, wherein the operations further comprise:
    determining a priority level for the particular ROI of the plurality of ROIs based on the feature detected within the initial image data associated with the particular ROI, wherein scheduling of the subsequent image data and the intermediate result is based on the priority level.

12. The system of claim 11, wherein determining the priority level for the particular ROI comprises:
    selecting the priority level from a plurality of priority levels based on the feature detected within the initial image data, wherein each respective priority level of the plurality of priority levels is associated with at least one corresponding image feature.

13. The system of claim 11, further comprising:
    a vehicle configured to operate based on outputs of one or more of the first plurality of image processing resources or the second plurality of image processing resources, wherein the priority level for the particular ROI is determined further based on (i) a task being carried out by the vehicle and (ii) a relationship between the task and the feature detected within the initial image data.

14. The system of claim 1, wherein at least one of the first image processing resource or the second image processing resource is selected further based on environmental conditions expected to be present at a time when the subsequent image data is generated.

15. The system of claim 1, wherein the initial image data is generated by the particular ROI, and wherein identifying the particular ROI comprises:
    determining that the feature detected within the initial image data is expected to remain within the particular ROI at a time when the subsequent image data is planned to be captured.

16. The system of claim 1, wherein the initial image data is generated by a second ROI different from the particular ROI, and wherein identifying the particular ROI comprises:
    determining that the feature detected within the initial image data is expected to move from the second ROI to the particular ROI and be viewable by the particular ROI at a time when the subsequent image data is planned to be captured.

17. The system of claim 1, wherein one or more of the first image processing resource or the second image processing resource is selected further based on an at least one of:
    (i) a first objective function configured to quantify a latency between obtaining image data by the image sensor and processing the image data, (ii) a second objective function configured to quantify a utilization of at least one of the first plurality of image processing resources or the second plurality of image processing resources, or (iii) a third objective function configured to quantify a throughput of the image data through at least one of the first plurality of image processing resources or the second plurality of image processing resources.

18. The system of claim 1, wherein the scheduler is also configured to schedule operation of one or more of: (i) a control system of an autonomous vehicle or (ii) communicative connections between different groups of image processing resources.

19. A method comprising:
    identifying, by a scheduler comprising one or more of circuitry or a processor, a particular region of interest (ROI) of a plurality of ROIs formed by a plurality of pixels of an image sensor, wherein the particular ROI is identified based on a feature detected within an initial image data associated with the particular ROI;
    selecting, by the scheduler and based on the feature detected within the initial image data, (i), from a first plurality of image processing resources located in a first layer of an integrated circuit, a first image processing resource by which subsequent image data generated by the particular ROI is to be processed to generate an intermediate result and (ii), from a second plurality of image processing resources located in a second layer of the integrated circuit, a second image processing resource by which the intermediate result is to be processed; and
    scheduling, by the scheduler, (i) the subsequent image data for processing by the first image processing resource and (ii) the intermediate result for processing by the second image processing resource.

20. A non-transitory computer readable storage medium having stored thereon instructions that, when executed by a computing device, cause the computing device to perform operations comprising:
    identifying a particular region of interest (ROI) of a plurality of ROIs formed by a plurality of pixels of an image sensor, wherein the particular ROI is identified based on a feature detected within an initial image data associated with the particular ROI;
    selecting, based on the feature detected within the initial image data, (i), from a first plurality of image processing resources located in a first layer of an integrated circuit, a first image processing resource by which subsequent image data generated by the particular ROI is to be processed to generate an intermediate result and (ii), from a second plurality of image processing resources located in a second layer of the integrated circuit, a second image processing resource by which the intermediate result is to be processed; and scheduling (i) the subsequent image data for processing by the first image processing resource and (ii) the intermediate result for processing by the second image processing resource.

\* \* \* \* \*